Feb. 17, 1925.
E. C. LITCHFIELD ET AL
1,527,146
CONVEYER FOR FERTILIZER DISTRIBUTORS
Filed April 19, 1923 — 2 Sheets-Sheet 1
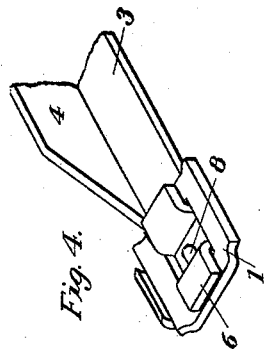
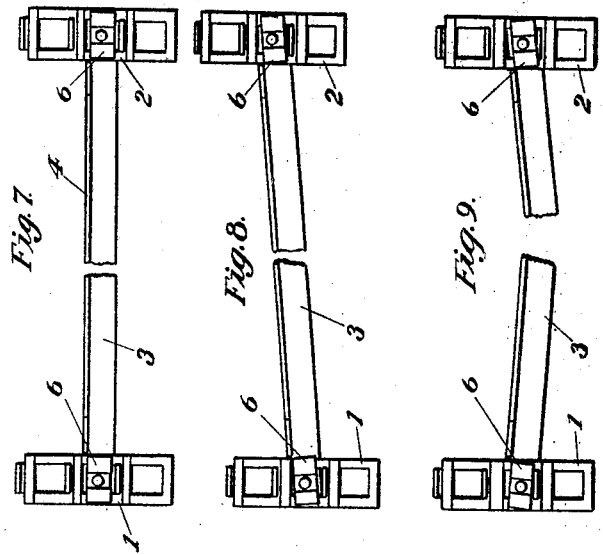
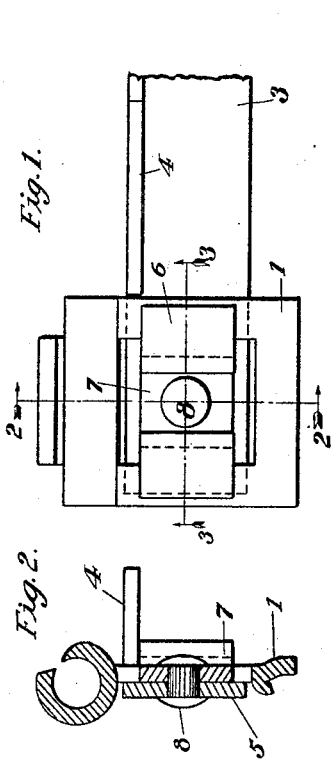
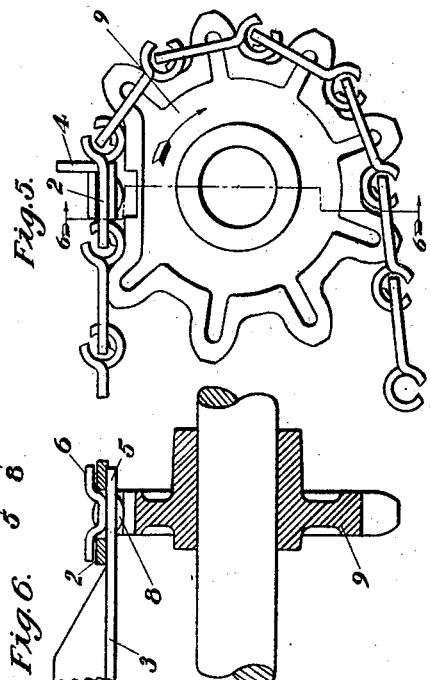
INVENTORS:
E. C. Litchfield
C. C. Hermann
BY
Wm. F. Freudenreich,
ATTORNEY

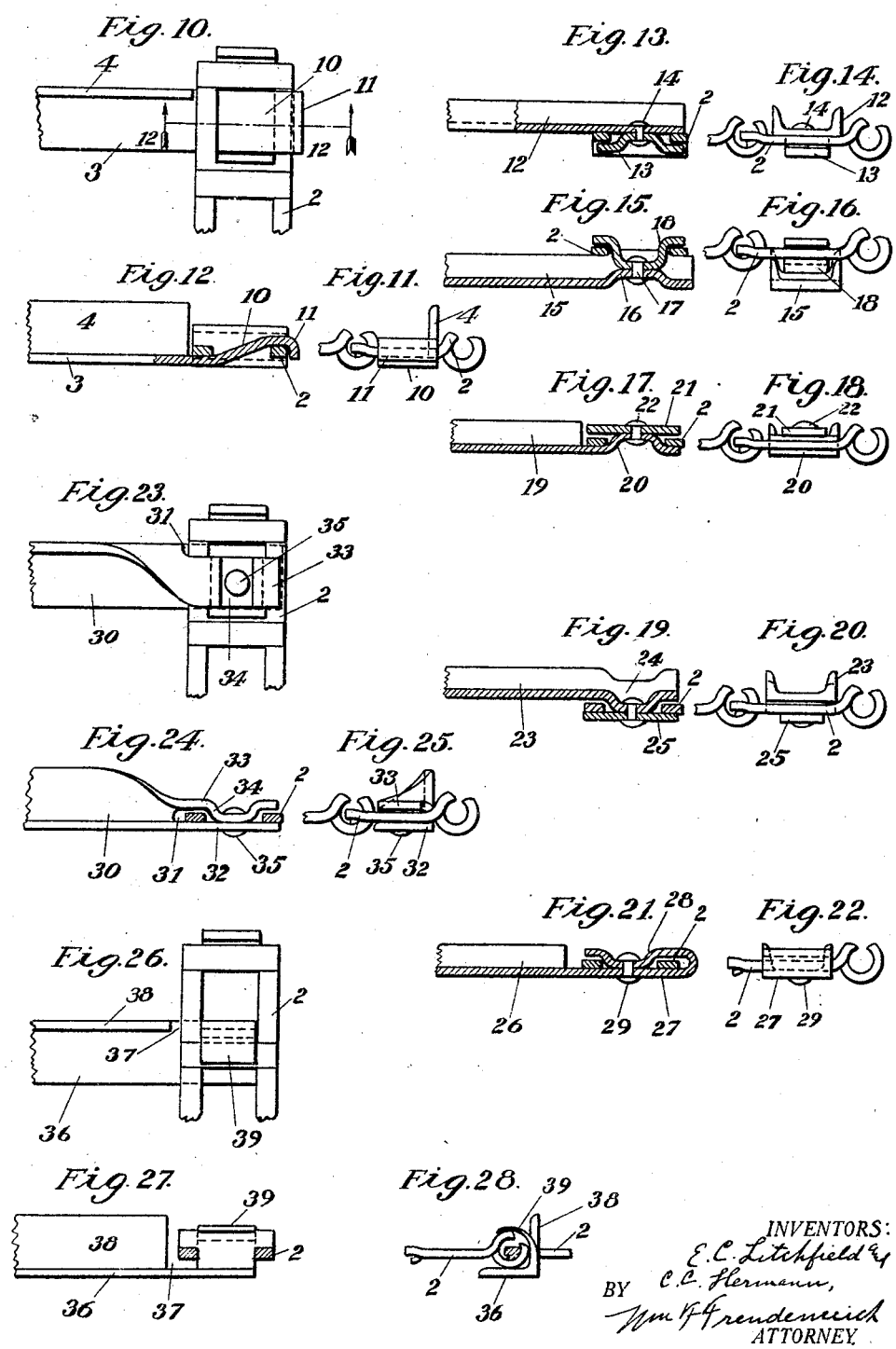

Patented Feb. 17, 1925.

1,527,146

UNITED STATES PATENT OFFICE.

EDGAR C. LITCHFIELD AND CLARENCE C. HERMANN, OF WATERLOO, IOWA; SAID HERMANN ASSIGNOR OF HIS ENTIRE RIGHT TO SAID LITCHFIELD.

CONVEYER FOR FERTILIZER DISTRIBUTORS.

Application filed April 19, 1923. Serial No. 633,327.

*To all whom it may concern:*

Be it known that we, EDGAR C. LITCHFIELD and CLARENCE C. HERMANN, citizens of the United States, residing at Waterloo, county of Blackhawk, State of Iowa, have invented certain new and useful Improvements in Conveyers for Fertilizer Distributors, and declare the following to be a full, clear, and exact description of the same, such as will enable others skilled in the art to which it pertains to make and use the same, reference being had to the accompanying drawings, which form a part of this specification.

A common type of manure spreader is one in which the contents are fed to the distributing means at the rear by means of an endless conveyer, the upper run of which overlies the bottom of the spreader box or body. These conveyers are commonly made of two so-called detachable link chains arranged at opposite sides of the spreader box and connected together at intervals by means of slats or cross pieces. So far as we know, special links have been required in the chains at the points of attachment of the slats to the chains. Furthermore, the slats have been connected rigidly to ears or legs projecting from one side of these special links. Thus it has been necessary to employ at least two kinds of links in each chain, and because the connections between the slats and the chains lie on one side of what may be called the longitudinal center line of each chain, and because of the rigid joints which place the chains under heavy stresses in case one chain is slightly in the lead, or in case the load upon the middle portion of a slat is great enough to spring it or bend it, much heavier chains have been required than are necessary simply for the purpose of moving the contents of the spreader.

The object of the present invention is to produce a simple and novel conveyer, of the character described, in which the chains may be ordinary detachable link chains or any other chains in which the links are all alike; and in which the connections between the slats and the chains are such that the only stresses that come upon the chains are those extending in the direction of the length of the chains, whereby chains much lighter than those heretofore deemed necessary may be used.

The various features of novelty whereby our invention is characterized will hereinafter be pointed out with particularity in the claims; but for a full understanding of our invention and of its objects and advantages reference may be had to the following detailed description, taken in connection with the accompanying drawings, wherein:

Figure 1 is a plan view of one end of a slat connected to a link of a detachable link chain, in accordance with our invention; Fig. 2 and Fig. 3 are respectively sections taken on line 2—2 and line 3—3 of Fig. 1; Fig. 4 is a perspective view of the parts shown in Fig. 1; Fig. 5 is a side elevation of one of the sprocket wheels over which the conveyer passes, a portion of the conveyer being shown on the sprocket wheel; Fig. 6 is a section taken approximately on line 6—6 of Fig. 5.

Figs. 7, 8 and 9 are plan views of a fragment of the conveyer, illustrating different positions which one of the slats may take; Figs. 10 and 11 are respectively a top plan view and an end view of a fragment of a chain and a modified connection between it and one of the slats; Fig. 12 is a section taken approximately on line 12—12 of Fig. 10; Figs. 13 and 14 are respectively a section taken on a plane extending transversely of the conveyer, and an end view, showing another modified connection between a slat and the chain; Figs. 15, 17, 19 and 21 are views similar to Fig. 13, each showing a different modification of the connection between a slat and the chains; Figs. 16, 18, 20 and 22 are end views of the devices shown in Figs. 15, 17, 19 and 21, respectively; Figs. 23, 24 and 25 are respectively a top plan view, a transverse section, and an end view of another modified connection between a slat and a conveyer chain; and Figs. 26, 27 and 28 are views similar to Figs. 23, 24 and 25, respectively, showing still another modification.

Reference being had to the first nine figures of the drawings, 1 and 2 represent the corresponding links in two parallel endless chains of a detachable link type. Between the links 1 and 2 extends a slat 3; similar slats being disposed in the usual or any desired way at intervals along the chains so as to form an endless ladder. The slats may be made of any suitable material and be of any desired cross sectional shape; they being preferably made of commercial steel shapes, that shape illustrated being an angle iron. As heretofore stated, the links are of any usual type open at the center and so joined together that they lie flat above the bottom of the spreader. The slats are made long enough not only to extend between the two chains, but also to overlie the latter at the ends of the slats. In the arrangement shown, the slats are so placed that one flange of each lies horizontal, while the other lies in a vertical plane. The vertical flange 4 is cut away at each end so that its effective length will be somewhat less than the distance between the inner edges of the chains; thus causing the ends of the horizontal flanges to take the form of tongues 5 crossing the links to which the slats are to be attached. In the arrangement shown the tongues at the ends of the slats lie underneath the links, so that the wear due to the drawing of the conveyer over its supports will come on the slats rather than on the links. Each tongue is loosely fastened to its corresponding link by means of a plate 6 long enough to extend across the central opening in the link and having its central portion depressed, as indicated at 7, so as to rest on the underlying tongue. A rivet 8 passed through the plate 7 and the underlying tongue fastens them permanently together. The depression at the center of the plate is somewhat greater than the thickness of the link, so that when the link rests on the tongue there is more or less space between the upper surface of the link and the under faces of the end portions of the plate. The result is that the link may move lengthwise of the tongue and may also rotate about a vertical axis. As a matter of fact, the joint between the slat and the link is, in a limited sense, a universal joint.

When the conveyer is in operation the slats are intended to lie at right angles, to the chains but, it may happen that one chain leads the other so that a slat will tend to take the position indicated in Fig. 8; or, again, a load may come on the center of one of the slats sufficiently great either to spring it into a bowl shape or to bend it, as indicated in Fig. 9. Both of these abnormal conditions would produce serious consequences if the connections between the ends of the slats and the chains were rigid; but, since there is flexibility and looseness in the joints, abnormal stresses in the chains are avoided.

The sprocket wheels over which the conveyer passes may be of ordinary form, as indicated at 9 in Figs. 5 and 6, one of the teeth being omitted at that point in the periphery opposite which the slats lie when they reach the periphery of the sprocket wheel.

In Figs. 10, 11 and 12 there is shown a construction in which the connection between an end of the slat and the link is made by forming the tongue 10 at the end of the slat long enough to extend upwardly from below the link, through the open center thereof and then being bent downwardly into the form of a hook 11 over the outer bar of the link. When the conveyer is assembled in the machine the slats cannot accidentally become detached, but they may readily be disconnected by simply forming sufficient slack in the chains to permit the latter to be twisted through an angle of 90 degrees about an axis extending lengthwise of a chain, whereupon the hooked ends of the tongues in the slats may be drawn out. In order that the chains may be twisted, for the purpose of removing the slats, it is necessary to disconnect both chains at some point between two slats. After this has been done, the end of each chain can be raised and at the same time twisted to detach the first slat. Thereafter, one slat after another can be detached in the same way.

In Figs. 13 and 14 is shown a slat 12 in the form of a channel iron which overlies and rests upon the chain. A plate 13 similar to the plate 6, heretofore described, lies on the under side of the link and is attached to the channel iron by means of a rivet 14. With this arrangement it becomes unnecessary to cut away the vertical flanges of the slat in order to clear the chain, because the slat lies wholly above the chain.

In Figs. 15 and 16 the slat 15 is in the form of a channel underlying the chain, which consequently rests on the upper edges of the side flanges of the channel iron. The channel iron is bent upwardly for a short distance near the end, as indicated at 16, so as to form a pocket for the bottom head of a rivet 17 passing upwardly through the bottom of the channel iron and through a holding plate 18 overlying the chain and extending downwardly through the open center of the link, as in the first form of the invention illustrated.

In Figs. 17 and 18 the slat 19 is formed of a channel iron having the vertical flanges cut away at the ends to form tongues 20 (only one of which is shown) underlying the chains. Each tongue is bent upwardly through the open center of the overlying link, so that the top holding plate 21 may be simply a flat plate secured to the hump or projection in the tongue by means of a rivet 22.

In Figs. 19 and 20 there is illustrated a modification of the arrangement shown in Figs. 15 and 16, the channel iron slat 23 having a portion 24 pressed downwardly near the end so as to form a boss or projection adapted to pass through the open center of an underlying link and having a depth somewhat greater than the vertical thickness of the link. The holding plate 25 is placed underneath the link and may take the form of a small flat member.

In Figs. 21 and 22 the slat 26 has formed on the end thereof a tongue 27 long enough to extend underneath a link of the chain and be bent back over the top of the link; the overlying portion of the tongue having a section bent downwardly, as indicated at 28, to form a boss or projection lying within the open center of the link and resting on that portion of the tongue which extends across the under side of the link. A rivet 29 is passed through the two engaging portions of the tongue. In other words, the holding plate shown in Figs. 1, 2 and 3 is simply made a part of the tongue.

In Figs. 23, 24 and 25 the slat 30 is in the form of an angle iron having two tongues formed by cutting a slot 31 somewhat wider than the vertical thickness of one of the links inwardly from the end of the vertical flange adjacent to the corner of the angle. The tongue 32 which constitutes a continuation of the horizontal flange of the angle iron underlies the link, while the vertical flange is bent at the base of the tongue 33 which forms a continuation thereof, so as to make this tongue lie flat above the link and above the underlying tongue 32. The tongue 33 has a part 34 bent downwardly through the open center of the link and resting on the tongue 32 to which it is attached by means of a rivet 35.

In Figs. 26, 27 and 28 the slat 36 is in the form of an angle iron having a slot 37 cut downwardly through the vertical flange 38, near the end of the slat; the slot being wider than the width of one of the bars of the link to which the slat is to be attached. There is thus formed a vertical tongue 39 which is made of such a width that it will pass through the open center of a link and may then be bent inwardly over the hinge connection between this link and the next consecutive link.

It will thus be seen that each of the different forms of our invention permits the use of ordinary interlocking-link chains without requiring special links at the points where the slats are attached. Furthermore, the slats are all connected to the chains in such a manner that there will be sufficient flexibility in the conveyer as a whole to avoid abnormal stresses in the chains; and the chains need therefore be made only heavy enough to do the work of moving the load in a spreader by a direct pull, or considerably lighter than those heretofore required. It will also be seen that the slats themselves may conveniently be simple structural shapes on which little work need be done to form slats; while the fastening elements, where additional elements for this purpose are employed, are also of the simplest kind; so that the conveyer as a whole will be light, strong and comparatively inexpensive.

While we have illustrated and described with particularity only a single preferred form of our invention, with a few modifications, we do not desire to be limited to the exact structural details thus illustrated and described; but intend to cover all forms and arrangements which come within the terms employed in the definitions of our invention constituting the appended claims.

We claim:

1. In combination, two parallel chains containing links lying flat in the plane of the chains and open in the center, slats extending transversely between said chains, and connections between the ends of the slats and certain of said links including elements passing through the open centers of the links for locking the slats and the chains together and at the same time permitting limited relative movements between the slats and the chains.

2. In combination, two parallel chains containing links lying flat in the plane of the chains and open in the center, slats extending transversely between said chains, and connections between the ends of the slats and certain of said links including elements passing through the open centers of the links for locking the slats and the chains together and at the same time permitting limited oscillating movements of the slats and also limited movements of the slats in the directions of their lengths relative to the chains.

3. In combination, two parallel chains containing links lying flat in the plane of the chains and open in the center, slats extending transversely between the chains, and means fixed to the ends of each slat and passing through the open centers of the corresponding aforesaid links to fasten the slats to the chains.

4. In combination, two parallel chains containing links lying flat in the plane of the chains and open in the center, slats extending transversely between the chains, and means fixed to the ends of each slat and passing through the open centers of the corresponding aforesaid links to fasten the slats loosely to the chains.

5. In combination, two parallel chains containing links lying flat in the plane of the chains and open in the center, slats arranged between and having portions at the ends extending across the chains, and means cooperating with said end portions of the slats and passing through the open centers of the aforesaid links to fasten the slats to the chains.

6. In combination, two parallel chains made of interlocked links open in the center, slats arranged between said chains and having end portions extending across and lying flat on the open centers of the links, and means associated with said end portions and passing through the open centers of the links for loosely securing the slats to the chains.

7. In combination, two parallel chains each made of similar interlocked links lying flat in the plane of the chains having open centers, slats extending between said chains, and means passing through the open centers of the links lying adjacent to the ends of the slats for securing the slats and the chains together.

8. In combination, two parallel chains containing links lying flat and open in the center, slats arranged between said chains and each having portions extending across the chains, and means lying on the opposite side of the chains from said end portions and connected to said end portions through the open centers of said links for fastening the slats to the chains.

9. In combination, two parallel chains containing links lying flat and open in the center, metal slats of structural shapes arranged between and lying flat at their ends against the said chains, and means passing through the open centers of said links and fastened to the ends of the slats to secure the slats and the chains together.

10. In combination, two parallel chains containing links lying flat in the plane of the chains and open in the center, metal slats arranged between and lying flat at their ends against said chains, said slats having flanges arranged at right angles to the plane of the chains, and means connected with the ends of the slats and passing through the open centers of said links to fasten the slats loosely to the chains and maintain the said flanges at right angles to the plane of the chains.

In testimony whereof we sign this specification.

CLARENCE C. HERMANN.
EDGAR C. LITCHFIELD.